May 31, 1927.

G. H. MAAS 1,630,575

CARBONATOR

Filed July 26, 1917

G. H. MAAS 1,630,575

CARBONATOR

Filed July 26, 1917

May 31, 1927.  
G. H. MAAS  
CARBONATOR  
Filed July 26, 1917  
1,630,575  
3 Sheets-Sheet 3

Patented May 31, 1927.

1,630,575

UNITED STATES PATENT OFFICE.

GEORGE H. MAAS, OF MILWAUKEE, WISCONSIN.

CARBONATOR.

Application filed July 26, 1917. Serial No. 182,968.

The invention relates to an apparatus for carbonating waters.

The purpose of my invention is to construct an improved carbonator so as to endow it with an increased efficiency, in the provision of an enlarged capacity for gas absorption. This result is secured in my invention by the employment of devices which operate to effect a wider distribution or spreading of the water when admitted to the apparatus, so that a more thorough impregnation of the water by the gas may take place. By enlarging the water surface which is exposed for gas absorption, in accordance with my invention, I am enabled to construct my improved carbonator as a very simple and compact affair.

It is established that at or near its normal temperature (62° F.), water will absorb nearly its own volume of carbonic acid gas, and by the diffusion of the water in the manner hereinafter described, so as to enlarge its exposed surface, the absorption takes place much more completely and with greater facility.

My invention also comprises a plurality of trays or pans arranged in superposed relation in the chamber of the carbonator, and from which the water is allowed to drip from one to the next, each tray being provided with a plurality of depending pins passed loosely through the bottom thereof, so that as the water trickles thinly over the surface of the pins, it is widely distributed and presents its greatest absorption surface for impregnation by the gas, which is admitted to the chamber in which the trays or pans and pins are located.

My invention further comprises means operating automatically to control the flow of water and gas into the carbonator, such means being embodied in sensitive devices which are quickly responsive to the differential pressures within the carbonator which are created or induced by a relaxation of the pressure in drawing off the charged liquid therefrom.

The novelty residing in these and other features of construction hereinafter more specifically described, will be set forth in the appended claims.

Figure 1:
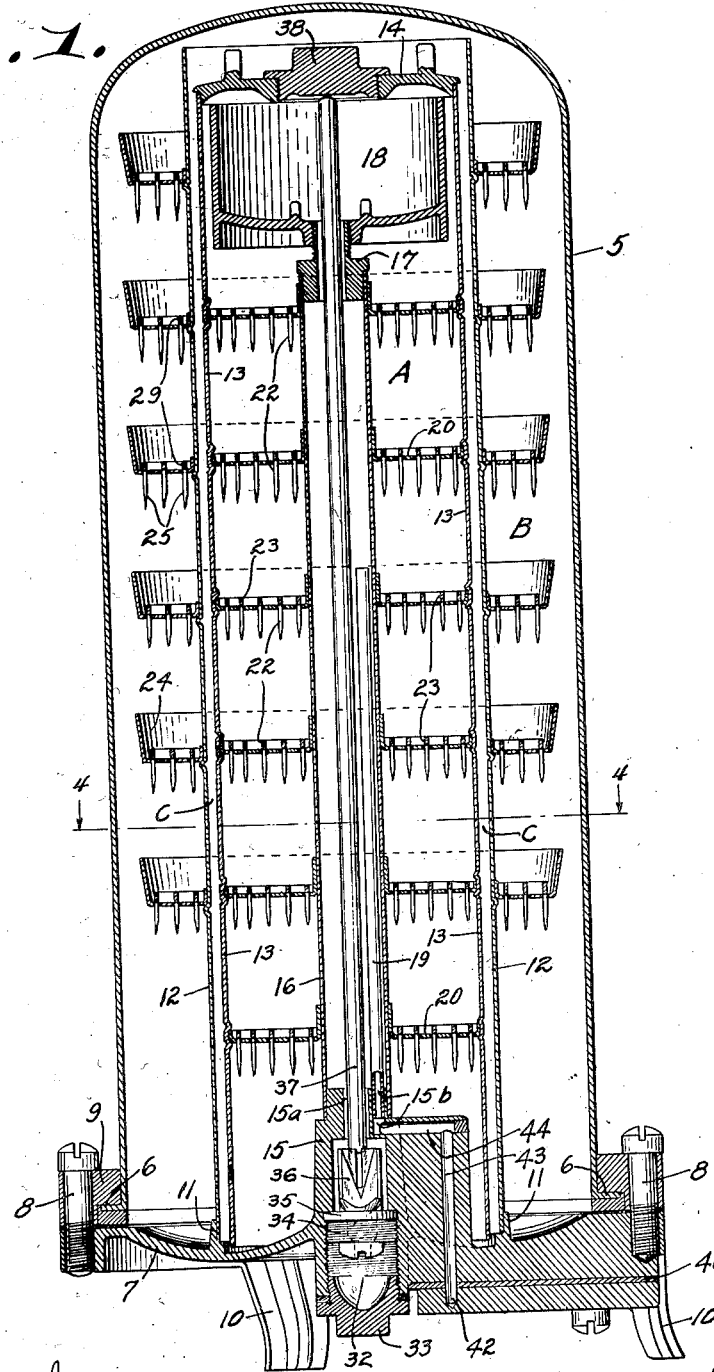
Figure 1 is a vertical sectional view on the line 1—1, Fig. 2, through a carbonator constructed in accordance with my invention.
Figure 2:
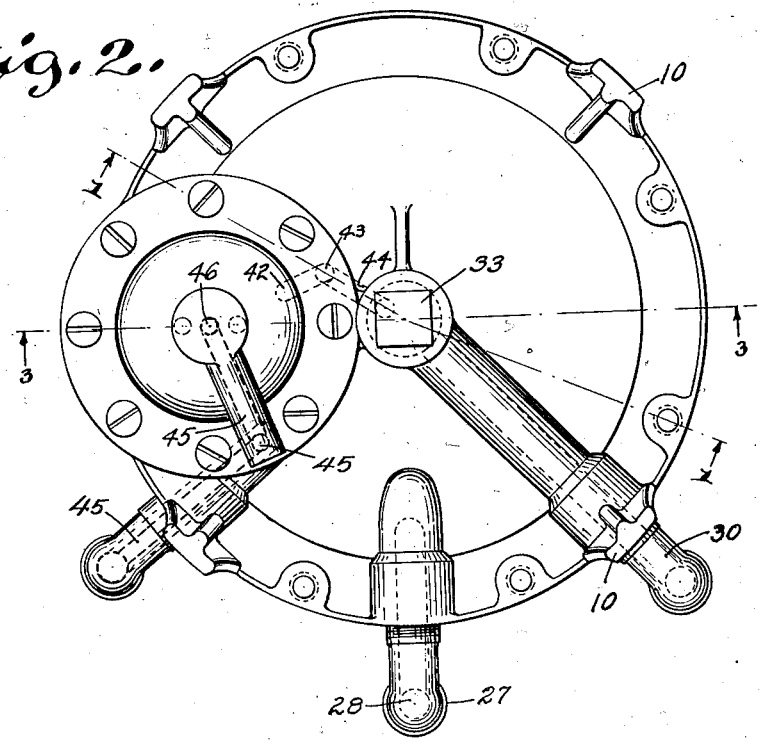
Fig. 2 is an inverted plan view looking at the bottom of the carbonator.
Figure 3:
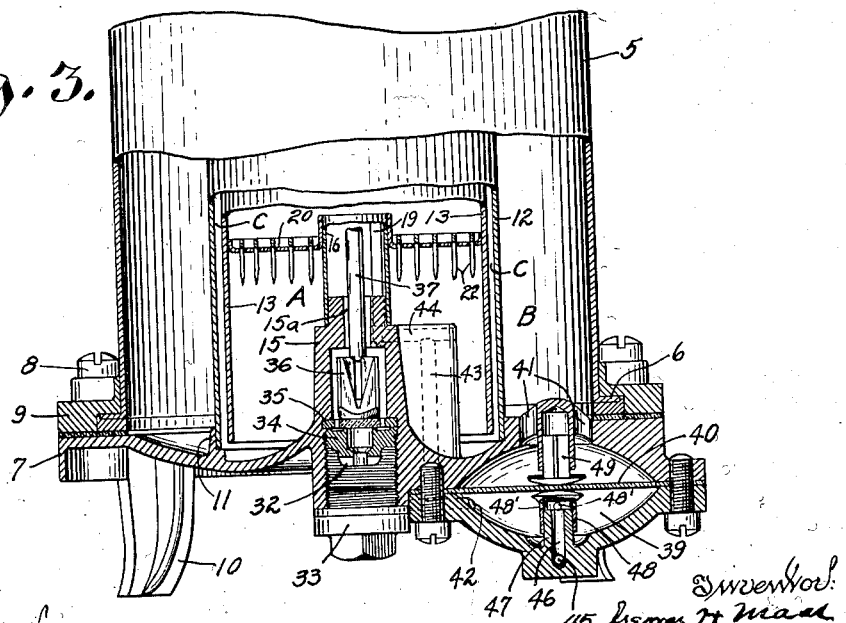
Fig. 3 is a vertical sectional view on the line 3—3, Fig. 2, through the lower part of the carbonator, and in a plane at an oblique angle to the plane on which the sectional view of Fig. 1 is taken.
Figure 4:
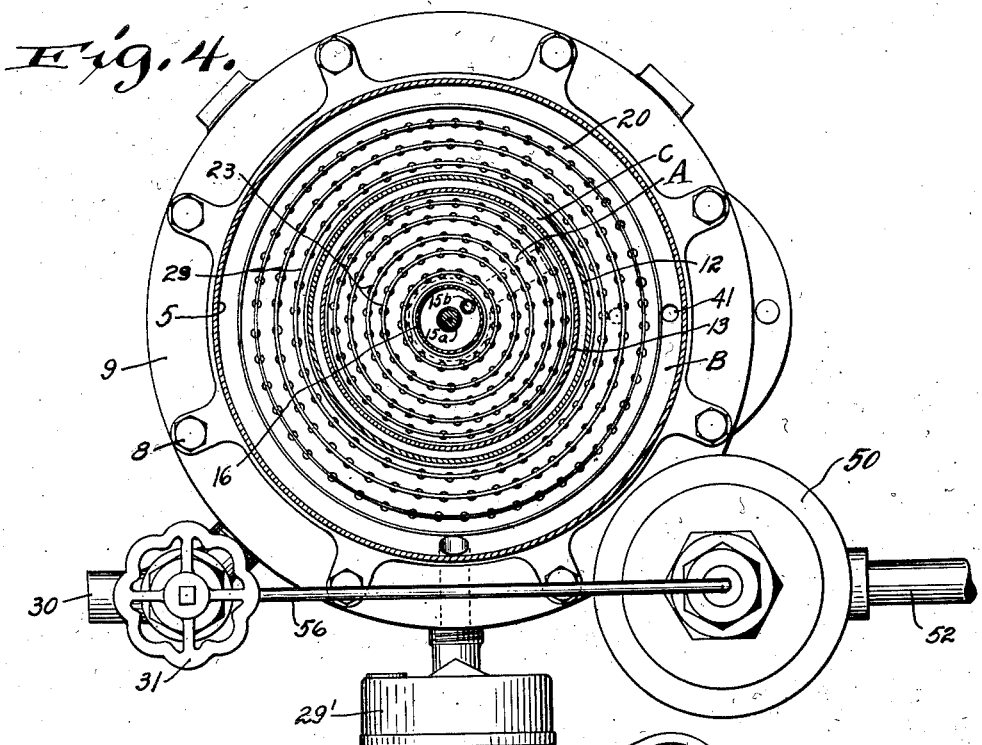
Fig. 4 is a horizontal sectional view through the carbonator, on the line 4—4, Fig. 1.
Figure 5:
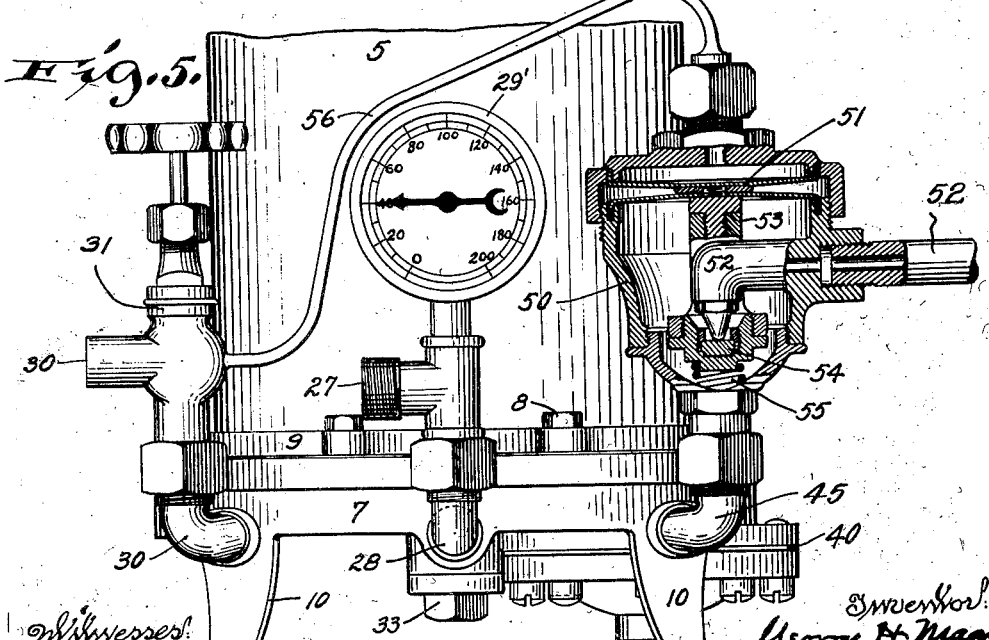
Fig. 5 is a view in elevation of the lower portion of the carbonator showing certain features of construction, parts being shown in vertical section.

Referring now in detail to the drawings, the numeral 5 designates the exterior casing of the carbonator, which casing is in the tubular or shell form shown, closed at one end and open at the other, and is arranged so as to stand vertically with its closed end uppermost. The open lower end of the vertically disposed casing 5 is provided with an outwardly extending circumferential flange 6 which lies in the transverse plane of the said open end, and is adapted to be seated upon a base 7 to which it is secured by bolts 8, the latter passing through a retaining ring 9 and into the said base 7. The ring 9 is slipped over the casing 5 and brought down so as to bear upon the said flange 6, so as to clamp the casing 5 firmly upon the base 7, through the action of the bolts 8. A suitable packing ring may be interposed between the base and the lower face of the flange 6, to insure a tight connection. The base is provided with suitable legs 10 for supporting the carbonator at a slight elevation, but sufficient to afford a clear space for the arrangement of certain structural elements thereunder.

Many of the structural elements of the carbonator assembled within the casing 5, are conveniently formed and arranged coaxially with relation to the said casing. The base 7 is provided at its top with an upstanding circular flange 11, so arranged, and provided with an annular shoulder or step upon its inner vertical side. A tubular member 12 rests with a close fit at its lower end upon the said shoulder or step on the flange 11, and extends vertically to a point near the top or closed end of the casing 5.

A second tubular member 13 of somewhat smaller diameter than that of the member 12 is arranged within the latter and is slightly separated therefrom at all points in its length so as to permit its free vertical movement under pressure exerted from within. The member 13 is sustained with its lower end in a position a little above the base 7, so as to be at all times free from engagement therewith. The means whereby such suspension of the inner tubular member 13 is effected will be hereinafter described.

A plug cap 14 is fitted into the upper end of the tubular member 13, so that the said member in its pendant state is supported therefrom. The closure of the tubular member 13 at its upper end by means of the cap 14, creates what I have termed an inner chamber and indicated such chamber by the letter A, the said chamber being open at its lower end by reason of the arrangement previously described. The separation of the respective inner and outer walls of the tubular members 12 and 13, provides a space which I have indicated by the letter C, which communicates at its lower end with the chamber A, and is open at its upper end. The space between the exterior of the tubular member 12 and the inner side of the casing 5, provides a chamber indicated by the letter B, which communicates at its upper end with the chamber C, but is closed at its lower end, except as to the outlet for the carbonated water, as hereinafter described.

An upstanding boss 15 is formed upon the base 7 near its center, the said boss being provided with a water inlet port 15$^a$ and a gas inlet port 15$^b$, such ports leading into a pipe 16, the lower end of the pipe being fitted about the reduced upper end of the boss. The pipe 16 is arranged centrally of the chamber A, and in its upper end is inserted the member 17 depending from the cup 18. The member 17 may be conveniently formed as a nipple entering a perforation in the bottom of the cup 18 at one end, and the upper end of the pipe 16 at the other, so as to connect those parts.

A gas discharging tube 19 of small diameter arranged within the pipe 16, leads from the gas inlet port 15$^b$, to a point above the mid-length of the pipe 16.

Upon the interior of the tubular member 13 and within the chamber A, shallow pans 20 are supported in fixed relation, such pans being attached to the member 13 so as to move therewith, and each provided with a central upstanding ring or wall embracing loosely the pipe 16, so as to have capacity for free movement thereover, when vertical movement of the member 13 takes place. The other wall of the pan is formed by the member 13. The bottom of each of the pans 20 is provided with circular rows of perforations through which pass and project from the lower side of the pan, pins 22 arranged in the same order, and which are carried by rings 23 which rest upon the bottom of the pans.

A like arrangement of pans 24, the bottoms of which are apertured to receive like pins 25 carried by rings 29, is provided in chamber B. In such arrangement, however, the outer wall of the pan may be co-incident with the diameter of the chamber B, but in the construction shown, a slight clearance is allowed to permit the easy assembly of the parts. The pan is attached to the tubular member 12 at the juncture of the large central opening therein, through which it is fitted about the member 12, the said member constituting the inner wall of the pan.

Water is admitted to the carbonator through a supply pipe 30, in the line of which a stop cock 31 is coupled for controlling the volume of the water. The said pipe 30 leads to a chamber 32 formed in the boss 15 at the under side of the base 7, the chamber being closed at its bottom end by a plug 33, which may be removed to permit the insertion in position in the said chamber of the elements which control the movement of the water into the carbonator. A centrally perforated screw plug 34, inserted in the threaded lower end of the chamber 32, bears against a diaphragm 35, of rubber or other flexible material, and holds the latter in an annular seat formed by reducing the diameter of the chamber 32 at approximately its midlength. A block 36, slightly less in diameter than the chamber 32, is supported in the reduced upper part of the chamber, being retained therein by the diaphragm 35, upon which it rests. The said block 36, has capacity by reason of its lesser length for a limited upward movement in the chamber 32, under the pressure of the water exerted against the lower side of the diaphragm, such movement being arrested by contact of the upper end of the block with the adjacent wall of the said chamber. The water inlet port 15$^a$, hereinbefore referred to, is formed as a perforation of small bore in the said upper end wall of the chamber 32.

The diaphragm 35 is provided with perforations out of line with the central perforation of the screw plug 34, so that whenever the water pressure in the supply pipe 30 is less than that exerted upon the other side of the diaphragm 35, the latter will not be vibrated, but will remain seated flat upon the plug 34 thus covering the perforations in the diaphragm so that the water in the lower part of the chamber 32 cannot pass into the upper part of such chamber. But whenever the pressure against the upper side of the diaphragm falls below that of the water pressure in the supply pipe, the diaphragm will be vibrated, and open the perforations therein to permit the flow of the water into the carbonator.

In such vibration of the diaphragm, the upper end of the plug 36 may be moved into contact with the end wall of the chamber, and ordinarily would close the inlet port 15ª to the further passage of the water so admitted to the upper part of the chamber 32. In order to avoid this interference, and permit the flow of water through the port 15ª, I transversely slot and also cut away portions of the sides of the plug at its upper end, so that with such upper end in contact with the adjacent wall of the chamber, the water may pass through the openings thus provided in the plug.

A rod 37 arranged axially within the pipe 16, is guided by and movable freely in the inlet port 15ª in the boss 15, and the perforation in the nipple 17 at the upper end of the pipe 16. The lower end of the said rod rests upon the upper end of the block 36, being engaged by the slotted formation therein. The upper end of the rod 37 engages the underside of a plug 38, threaded into a central bore in the cap 14 of the tubular member 13. The tubular member 13, together with the pans, pins and rings carried thereby, and the cap 14, constitute a structure of considerable weight, which exerts a sealing pressure upon the diaphragm 35, and which weight must be released before the water can flow through the inlet port 15ª. The manner in which such release is automatically effected will be described later.

Gas is admitted to the carbonator through the discharging tube 19, which rises in the pipe 16, the gas entering the tube 19 through the inlet port 15ᵇ, as before stated. Tracing the line from the said inlet port to the source of supply, the gas is supplied from its exterior source through a pipe 52, from which it may pass through ducts 45 and 46, into a chamber 39 formed at the underside of the base 7, and thence through connected ducts 42, 43 and 44 to the inlet port.

The chamber B is provided with water outlets 41, formed in the base 7, and which communicate directly with the said chamber 39. In the latter a diaphragm 40 is arranged, it being subject to vibration by gas pressure at its lower side and water pressure at its upper side. The duct 46 leads through a boss 47, formed interiorly of the chamber 39 and extending toward the diaphragm 40 therein. A sliding cap 48, having valve openings 48' in the sides thereof, is mounted upon the said boss. The tendency of the gas pressure flowing through the duct 46 is to move the cap and the diaphragm against which it bears, until the valve openings of the cap clear the end of the boss, whereupon the gas will be permitted to flow into the chamber 39. The superior pressure exerted by the water in chamber B of the carbonator will move the diaghragm oppositely to cause it to close the valve openings in the cap 48, and cut off the gas pressure.

In the operation of my invention, the connections are so arranged that the water will be admitted into the carbonator at a pressure which is slightly in excess of that of the gas, inasmuch as the most satisfactory results are attained under such conditions.

Upon opening the stop cock 31 in the water line the gas being cut off at the time, the pressure of the water overcomes the weight imposed upon the diaphragm 35 in the chamber 32, and permits the water to flow until the chambers A, B and C are filled. The water is then shut off and the pressure withdrawn, so that the valve formed by the block 36 in the chamber 32 is closed. Gas is then admitted by opening a stop cock in the line 52, and the displacement of the water in the several chambers takes place under the pressure of the incoming gas, the water then flowing out through the outlet 28, leading from the outer chamber B, through the base 7, and the connection 27. The flow of gas continues until the water is forced by gas pressure from the chambers A and C into the chamber B, and until the level of the water in the latter is near the lowermost pan 24 in the last mentioned chamber. But this same condition may be attained by admitting a sufficiently limited quantity of water and displacing it by gas pressure until it fills the lower part of the chamber B. These operations act to prime the carbonator so that its features will function properly.

Water and gas are now turned on. At the same time the gas in the carbonator as well as that which flows through the discharging tube 19, commingles with the water as the latter rises to the cup 18. When the latter is filled to overflowing, the water flows over the sides of the cup and falls into the upper tray 20, where it is collected and trickles through the perforations therein and over the depending pins 22. The water then falls to the next tray and so on until the bottom of the chamber A is reached. In its passage through the successive trays of the chamber, the water surface presents an enlarged exposure, so that such saturation by the gas in the chamber is greatly facilitated. The water collected in the bottom of the chamber A is forced upwardly through the chamber C formed by the space separating the tubular members 12 and 13. Reaching the top of the tubular member 12, the water overflows into the pans 24 in the chamber B, where it is further diffused by the pins 25 in the same manner, so that saturation of the water is now complete. The inflow of gas and water continues until the carbonator is filled with charged water.

Drawing off may be effected through the outlets 28 and 27, to which latter the delivery pipe having a suitable stop cock may be coupled. A pressure indicator or gauge 29' may be connected to the outlet, for indicating the state of pressure in the carbonator at the time of drawing off the charged water.

In the construction described, the internal pressure in the carbonator is equal throughout at any stated time, but the provision of the elastic or resilient diaphragm in the chamber 32 will permit a response to the pressure exerted by the gas in the carbonator upon the upper end of the cap 14, and move the rod 37 lengthwise to seat the block 36 upon the diaphragm 35, and arrest the inflow of water. In the same operation, the internal pressure will be exerted through the ports 41 at the bottom of the chamber B, and move the diaphragm 40 in the chamber 39, to close the valve 48, and cut off the flow of gas. The apparatus will therefore be at a standstill until the internal pressure is lessened by drawing off through the outlet 28, whereupon the water pressure in the line 30 and the gas pressure in the line 52, will assert themselves to permit resumption of the injection, which continues until the pressure within is restored to its maximum. Then the passage of the water and gas into the carbonator will be arrested, as previously described. In the operation of the apparatus, it occurs that a superior pressure is developed in the carbonator which is sufficient to arrest the separate inflow of water and gas and maintain the condition until such pressures become relaxed. But as before stated, the external water and gas pressures are substantially equal, with a slight difference in favor of the water pressure.

The weight of the columns of water in the tube 16 and chamber B, augments the closing action of the diaphragms 35 and 40. The upper part of the chamber 39 is formed with a vertical guide in which the polygonal shank of a plug 49 is adapted to move with a dash-pot effect to restrain the vibration of the diaphragm 40 under the incoming gas pressure.

The apparatus is instantly responsive when the saturated water is drawn off, and so maintains a uniformly charged content within the carbonator at all times.

Although it is my desire to operate the apparatus with substantially equal pressures in the water and gas inlet lines, it happens sometimes that the external water pressure is subject to considerable variations. To avoid the irregularities of action resulting from widely different pressures as they occur, I provide compensating means in the nature of a pressure controlling valve. Such valve includes a casing 50, into which the nozzle of the gas inlet line 52 leads, and out of which the gas flows through ducts 45 and 46, as hereinbefore described. A diaphragm 51 in the casing is open to pressure of water flowing through a tube 56, connected with the water line inlet 30. The lower side of the diaphragm carries a yoke 53, provided with a packing 54, which is pressed against the discharge nozzle of the gas line 52, by an expansion spring 55. The normal pressure of the water upon the diaphragm 51 will open the nozzle for the flow of gas, and increased water pressure will act to permit a stronger flow of gas, such flow being regulated by the variations in the water pressure.

While I have shown and described my invention as a carbonator for charging water with carbonic acid gas, it will be understood that my invention is equally applicable for saturating any liquid with a desired gas.

Having thus described my invention, what I claim and desire to secure by Letters Patent of the United States, is:

1. In an apparatus of the class described including a casing, a movable chamber structure within the casing, means for supplying gas and liquid to the casing, and means operated by movement of the chamber structure for governing the flow of liquid into the casing.

2. An apparatus of the class described including a casing, an inner chamber structure in the casing, a fixed tubular member surrounding said chamber structure and spaced from the top of the casing and forming an outer chamber in conjunction with said casing, a discharge port for said outer chamber, means for admitting gas and liquid to the outer chamber at the top portion of said inner chamber, means governed by pressure in the outer chamber for controlling the inlet flow of gas, and means controlled by movement of the inner chamber structure for governing the inlet flow of liquid.

3. An apparatus of the class described including a casing, an inner chamber structure in the casing, a tubular member surrounding said inner chamber structure and spaced from the top of the casing, and forming an outer chamber in conjunction with said casing, a discharge port for said outer chamber, means for admitting gas and liquid to the outer chamber at the top portion of said inner chamber, and means governed by pressure in the outer chamber for controlling inlet of liquid to the inner chamber.

4. An apparatus of the class described including a casing, an inner chamber structure in the casing, a tubular member surrounding said inner chamber structure and spaced from the top of the casing, and forming an outer chamber in conjunction with said casing, a discharge port for said outer chamber, means for admitting gas and liquid to the outer chamber at the top portion of said inner chamber, means governed by pressure in the outer chamber for controlling the inlet of liquid to the inner chamber, and liquid flow retarding means in the chambers.

5. An apparatus of the class described including a casing, a tubular member fixed in the casing forming an annular chamber in conjunction therewith, a second tubular member forming a second chamber movable within the first and spaced therefrom to form an annular passageway, in communication at each end with only one chamber, liquid flow retarding means in the chambers, means for supplying gas in the chambers, means for introducing liquid at the top of the inner chamber, and means for drawing off liquid at the bottom of the other chamber.

6. An apparatus of the class described including a pair of chambers one arranged within the other, means for establishing communication between the bottom of one chamber and the top of the other, gas and liquid inlets for the inner chamber, a discharge outlet for the outer chamber, and means governed by pressure in the outer chamber for controlling inlet flow of gas in the inner chamber.

7. In an apparatus of the class described, the combination of a casing, a tubular chamber structure in the casing, a water conducting pipe extending upwardly in the chamber, a rod extending through the tube for actuation of the chamber structure, and a water inlet control valve governed by said rod.

8. In an apparatus of the class described, the combination of a casing, a chamber structure in the casing, a fixed water supply tube extending upwardly in the said chamber, water flow retarding means carried by said chamber structure, and means operated by movement of the chamber structure for controlling the inlet flow of water into the supply tube.

9. In an apparatus of the class described, the combination of a casing, a chamber structure in the casing, a fixed water supply tube extending upwardly in the chamber, means for introducing gas into said tube, a distributing cup at the upper end of the tube, and means operated by movement of the chamber structure for controlling the inlet flow of water into the supply tube.

10. In an apparatus of the class described, the combination of a casing, a movable chamber structure in the casing, a fixed water supply tube extending upwardly in the said movable chamber, a chamber below and communicating with said tube, a valve seat in the chamber, a valve block on the seat, a water supply connection below the seat, and a rod extended from the block through the tube for engagement by said chamber structure.

11. An apparatus of the class described, a casing, a tubular chamber structure therein, means for supplying liquid to the top portion thereof, means for supplying gas to the chamber, a series of superposed water flow retarding pans supported by the chamber structure and provided with annular series of apertures, series of dripping pins therein, and means for connecting the pins of each series together.

12. An apparatus of the class described, including a casing provided with gas and liquid inlets, a chamber, a diaphragm in said chamber, a duct for water connecting the chamber and casing at one side of said diaphragm, a duct connecting said chamber and gas inlet at the other side of the diaphragm, a boss in the chamber at one side of the diaphragm and provided with a gas supply passage, and a cap valve provided with a perforated annular wall slidable on said boss and movable by the diaphragm to control the flow of gas, under the water pressure upon the other side of the diaphragm.

In testimony whereof I affix my signature.

GEORGE H. MAAS.